United States Patent
Nakao et al.

(10) Patent No.: US 6,931,153 B2
(45) Date of Patent: Aug. 16, 2005

(54) HANDWRITTEN CHARACTER RECOGNITION APPARATUS

(75) Inventors: Ichiro Nakao, Amagasaki (JP); Yoshikatsu Ito, Hirakata (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 554 days.

(21) Appl. No.: 09/837,293

(22) Filed: Apr. 19, 2001

(65) Prior Publication Data

US 2002/0009226 A1 Jan. 24, 2002

(30) Foreign Application Priority Data

Apr. 20, 2000 (JP) .................................. 2000-118986

(51) Int. Cl.[7] .............................................. G06K 9/00
(52) U.S. Cl. ..................... 382/188; 382/187; 382/314
(58) Field of Search ............................. 382/187, 188, 382/189, 177, 185, 186, 314, 179; 345/179, 180

(56) References Cited

U.S. PATENT DOCUMENTS

| | | | | |
|---|---|---|---|---|
| 4,542,526 A | * | 9/1985 | Satoh et al. ................. | 382/187 |
| 4,727,588 A | * | 2/1988 | Fox et al. .................... | 382/189 |
| 5,341,438 A | * | 8/1994 | Clifford ....................... | 382/179 |
| 5,517,578 A | * | 5/1996 | Altman et al. .............. | 382/181 |
| 5,864,636 A | * | 1/1999 | Chisaka ...................... | 382/189 |
| 6,137,908 A | * | 10/2000 | Rhee ........................... | 382/187 |
| 6,167,411 A | * | 12/2000 | Narayanaswamy ......... | 715/541 |
| 6,327,386 B1 | * | 12/2001 | Mao et al. ................... | 382/186 |
| 6,694,056 B1 | * | 2/2004 | Ito et al. ...................... | 382/186 |

FOREIGN PATENT DOCUMENTS

| | | | | |
|---|---|---|---|---|
| JP | 61097790 A | * | 5/1986 | ............ G06K/9/62 |
| JP | 01068896 A | * | 3/1989 | ............ G06K/9/62 |
| JP | 8-249432 | | 9/1996 | |
| JP | 11-25224 | | 1/1999 | |

OTHER PUBLICATIONS

Machine Translation of JP 08249423 (Sep. 27, 1996, Miyashita).*
Machine Translation of JP 11025224 (Jan. 29, 1999, Kawamura et al).*
English Abstract of JP 61097790 A (May 16, 1986, Watari).*
English Abstract of JP 01068896 A (Mar. 14, 1989, Kamei).*
Dictionary.com/operable, http://dictionary.reference.com/search?q=operable, printed Feb. 25, 2004, pp. 1–3.*

* cited by examiner

Primary Examiner—Yon J. Couso
(74) Attorney, Agent, or Firm—Wenderoth, Lind & Ponack, L.L.P.

(57) ABSTRACT

A handwritten character recognition apparatus has a character string input area of a size that allows a user to hand write a plurality of characters thereon using a stylus. A coordinate detection unit extracts a coordinate string for each stroke that forms the handwritten character string. An input completion judgement unit judges an immediately preceding handwritten character string to be complete if a time difference between a last coordinate of an immediately preceding stroke and a first coordinate of a stroke being input is at least a predetermined time, when the first coordinate of the stroke is detected in a first area of the character string input area. A character segmentation unit segments a stroke string for each character from all the strokes of the previously input hand written character string from which a character recognition unit recognizes each character and outputs a character string which is the recognition result.

10 Claims, 15 Drawing Sheets

STROKE INFORMATION

| STROKE | COORDINATE STRING | START TIME | END TIME |
|---|---|---|---|
| 301 | (X11,Y11),⋯,(X1a,Y1a) | S1 | E1 |
| 302 | (X21,Y21),⋯,(X2b,Y2b) | S2 | E2 |
| ⋯ | ⋯ | ⋯ | ⋯ |
| ⋯ | ⋯ | ⋯ | ⋯ |
| 321 | (X31,Y31),⋯,(X3c,Y3c) | S3 | E3 |
| ⋯ | ⋯ | ⋯ | ⋯ |
| 323 | (X41,Y41),⋯,(X4d,Y4d) | S4 | E4 |

FIG. 7

STROKE INFORMATION
701

| STROKE | COORDINATE STRING | START TIME | END TIME |
|---|---|---|---|
| 301 | (X11,Y11),···,(X1a,Y1a) | S1 | E1 |
| 302 | (X21,Y21),···,(X2b,Y2b) | S2 | E2 |
| ... | ... | ... | ... |
| ... | ... | ... | ... |
| 321 | (X31,Y31),···,(X3c,Y3c) | S3 | E3 |
| ... | ... | ... | ... |
| 323 | (X41,Y41),···,(X4d,Y4d) | S4 | E4 |
| 601 | (X51,Y51) | S5 | |

HANDWRITTEN CHARACTER RECOGNITION APPARATUS

BACKGROUND OF THE INVENTION

1. Field of the Invention

The present invention relates to a handwritten character recognition apparatus for recognizing characters input using a stylus on a tablet.

2. Description of Related Art

Conventionally, a commonly used method in handwritten character recognition apparatuses is a method in which handwritten characters are input one at a time into a character input frame, the input of a handwritten character into a character input frame is judged to be complete, character recognition performed, and a recognition result output when input of a character into the next frame begins.

Furthermore, in a method disclosed in Japanese Patent Laid-Open No. H8-249432, when a character an input frame for inputting one character at a time is not prescribed, but rather a plurality of characters are input into a character string input area and a character string is recognized if there is no handwritten character input for a predetermined time, the input of the character string is judged to be complete, characters are segmented from the character string, character recognition is performed, and a recognition result is output.

In addition, in a method disclosed in Japanese Patent Laid-Open No. H11-25224, an input of a character string into a character string input area is judged to be complete, characters are segmented from the character string, character recognition is performed, and the recognition result is output when input of a character string is performed in a next character string input area.

There is no practical problem with judging input to be complete when there is no input for a predetermined time if characters are entered one at a time, but in the method disclosed in Japanese Patent Laid-Open No. H8-249423 there are cases in which the input of a character string is judged to be completed partway through being input because the user may take time to think while inputting the character string.

Furthermore, in the method disclosed in Japanese Laid Open Patent H11-25224, it is necessary to have a plurality of character string input areas which together take up a large amount of space. This means that other display areas are limited, making it difficult to employ this method in portable equipment.

SUMMARY OF THE INVENTION

The object of the present invention, in view of the above-described problems, is to provide a handwritten character recognition apparatus which can accurately judge input completion of a handwritten character string input into a character string input area that does not have a character input frame for inputting one character at a time, and output a character string which is the recognition result.

The objective of the present invention is achieved by a handwritten character recognition apparatus having a character string input area of a size that allows a plurality of characters to be handwritten thereon for a user to input a handwritten character string. The apparatus includes a coordinate string detection unit operable to detect a coordinate string of each stroke that makes up an input handwritten character string, an input completion judgement unit operable to judge, when a first coordinate of one of the strokes is detected in a first area which is at a side of the character string input area where writing of the handwritten character string starts, whether an input of an immediately preceding handwritten character string is complete, and a segmentation recognition unit operable to segment, when the input completion detection unit judges the input to be complete, stroke strings for each character from all the strokes of the immediately preceding handwritten character string, recognize each character, and output a character string which is a recognition result.

According to this construction, when a first coordinate of a stroke of a handwritten character string is detected to be in the predetermined first area, it is judged whether an input of a handwritten character string input immediately preceding is complete. When the input is judged to be complete, the immediately preceding character string can be recognized as one section. Therefore, the user can input character strings continuously into the character string input area without having to perform an operation to complete the input of the handwritten character strings.

Furthermore, the input completion judgement unit may include a first coordinate judgement unit operable to judge, when an X value of a first coordinate of a stroke is X1 or less, X1 being a width of the first area, that the first coordinate is in the first area.

According to this construction, the apparatus can judge accurately whether the first coordinate of a stroke is in the first area.

Furthermore, the input completion judgement unit may further include an X1 setting unit operable to receive a value of X1 according to a size of a handwritten character written by the user, the first coordinate judgement unit judging according to the received value of X1.

According to this construction, the first area can be set according to the size of the user's handwriting. Therefore, the handwritten character apparatus can be a user friendly apparatus which accurately judges breaks between handwritten character strings.

Furthermore, the input completion judgement unit may include an input time measurement unit operable to measure a first input time which is an input time of a first coordinate of each stroke, and a second input time which is an input time of a last coordinate of each stroke, and a time judgement unit operable to judge, when a time difference between the first input time of a stroke and a second input time of an immediately preceding stroke is at least a predetermined time, that the input of the immediately preceding handwritten character string is complete.

According to this construction, when a time difference between a first coordinate of a stroke entered into the first area and the last coordinate of an immediately preceding stroke is at least a predetermined time, the immediately preceding handwritten character string can be recognized as one section without the user having to perform an operation to complete the input of the handwritten character strings.

Furthermore, the input completion judgement unit may include a judgement time setting unit operable to receive a setting of a predetermined time according to a speed of input of handwriting of the user, the time judgement unit judging that the input of the immediately preceding handwritten character string is complete when the input thereof ceases for at least the predetermined time.

According to this construction, the value of the predetermined time can be set according to the input speed of the user's handwriting. Therefore, the handwritten character apparatus can be made a user friendly apparatus which judges accurately breaks between handwritten character strings.

Furthermore, the input completion judgement unit may include a stroke area judgement unit operable to judge that the input of the immediately preceding character string is complete when a first coordinate of a stroke thereof is in a second area which is an area at the opposite side of the character string input area to the first area.

According to this construction, when the first coordinate of a stroke input into the first area is detected, and the first coordinate of the immediately preceding stroke is in the second area, the immediately preceding handwritten character string can be recognized as one section without the user having to perform an operation to complete the input of the handwritten character string.

Furthermore, the handwritten character recognition apparatus may further include a display unit, positioned under a transparent tablet which makes up the character string input area, operable to successively display strokes by linking the coordinates of each coordinate string-detected by the coordinate string detection unit by line segments, and an area display control unit operable to control a display state of the display unit so as make the first area and the second area visually recognizable.

According to this construction, when the user completes an input of a handwritten character string that is one section, the second area for inputting the last character of a handwritten character string, and the first area for inputting the first character of a handwritten character string are clear. Therefore the user can input handwritten character strings smoothly.

Furthermore, the handwritten character recognition apparatus may further include a display unit operable to display a stroke by linking the coordinates of each coordinate string successively detected by the coordinate string detection unit, and an erasing unit operable to erase all strokes that make up the immediately preceding handwritten character string when the input completion judgement unit judges the input thereof to be complete.

According to this construction, the display of the completed handwritten character string is erased with the input of a new handwritten character string.

Furthermore, the handwritten character recognition apparatus may further include a display unit operable to display a stroke by linking the coordinates of each coordinate string successively detected by the coordinate string detection unit, and an erasing unit operable to erase all strokes that make up the immediately preceding handwritten character string when the input completion judgement unit judges the input thereof to be complete.

According to this construction, when the user completes an input of a handwritten character string that is one section, the first area in which the first character of the next handwritten character string is to be input is made clear, therefore the user can input handwritten character strings smoothly.

Furthermore, the objective of the invention can be achieved by a handwritten character recognition apparatus having a character string input area of a size that allows a plurality of characters to be handwritten thereon for a user to input a handwritten character string, including a coordinate string detection unit operable to detect a coordinate string of each stroke that makes up an input handwritten character string, a display unit, positioned under a transparent tablet which makes up the character string input area, operable to successively display strokes by linking coordinates detected by the coordinate value detection unit by line segments, the coordinate string detection unit being a transparent tablet, a first line segment erasing unit operable to erase line segments displayed in a judgement area which is an area a predetermined distance apart from the last coordinate of a stroke detected by the coordinate string detection unit in a direction towards the side of the character string input area where writing of the handwritten character string starts, an input completion judgement unit operable to judge, when the coordinate string detection unit detects the first coordinate of a stroke in the judgement area, that an input of an immediately preceding handwritten character string is complete, a second line segment erasing unit operable to erase remaining line segments from the character string input area, excluding the line segments in the judgement area, and a segmentation recognition unit operable to segment, when the input completion detection unit judges the input to be complete, stroke strings for each character from all the strokes of the immediately preceding handwritten character string, recognize each character, and output a character string which is a recognition result.

According to this construction, when the input of a handwritten character string is complete, the judgement area of the character string input area in which the first character of the next handwritten character string is to be input is clear. Therefore, the user can input handwritten character strings smoothly.

Furthermore, the objective of the present invention can be achieved by program for use with a handwritten character recognition apparatus having a character string input area of a size that allows a plurality of characters to be handwritten thereon for a user to input a handwritten character string, the program realizing on a computer a coordinate string detection unit operable to detect a coordinate string of each stroke that makes up an input handwritten character string an input completion judgement unit operable to judge, when a first coordinate of one of the strokes is detected in a first area which is at a side of the character string input area where writing of the handwritten character string starts, whether an input of an immediately preceding handwritten character string is complete, and a segmentation recognition unit operable to segment, when the input completion detection unit judges the input to be complete, stroke strings for each character from all the strokes of the immediately preceding handwritten character string, recognize each character, and output a character string which is a recognition result.

By using this program, a handwritten character recognition apparatus is able to judge that input of a handwritten character string is complete without receiving an input completion operation from the user.

Furthermore, the objective of the present invention can be achieved by a computer-readable recording medium for use with a handwritten character recognition apparatus having a character string input area of a size that allows a plurality of characters to be handwritten thereon for a user to input a handwritten character string, the medium recording a program that realizes on a computer a coordinate string detection unit operable to detect a coordinate string of each stroke that makes up an input handwritten character string, an input completion judgement unit operable to judge, when a first coordinate of one of the strokes is detected in a first area which is at a side of the character string input area where writing of the handwritten character string starts, whether an input of an immediately preceding handwritten character string is complete, and a segmentation recognition unit operable to segment, when the input completion detection unit judges the input to be complete, stroke strings for each character from all the strokes of the immediately preceding handwritten character string, recognize each character, and output a character string which is a recognition result.

By applying this kind of recording medium to a handwritten character recognition apparatus, the apparatus can judge the completion of the input of a handwritten character string without receiving an operation from the user.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7 is a drawing showing the stroke information stored in the temporary storage unit of the character string completion judgement unit of the above-described embodiment;

DESCRIPTION OF THE PREFERRED EMBODIMENTS

The preferred embodiments of the handwritten character recognition apparatus of the present invention will be described below with reference to the drawings.

First Embodiment

Figure 1:
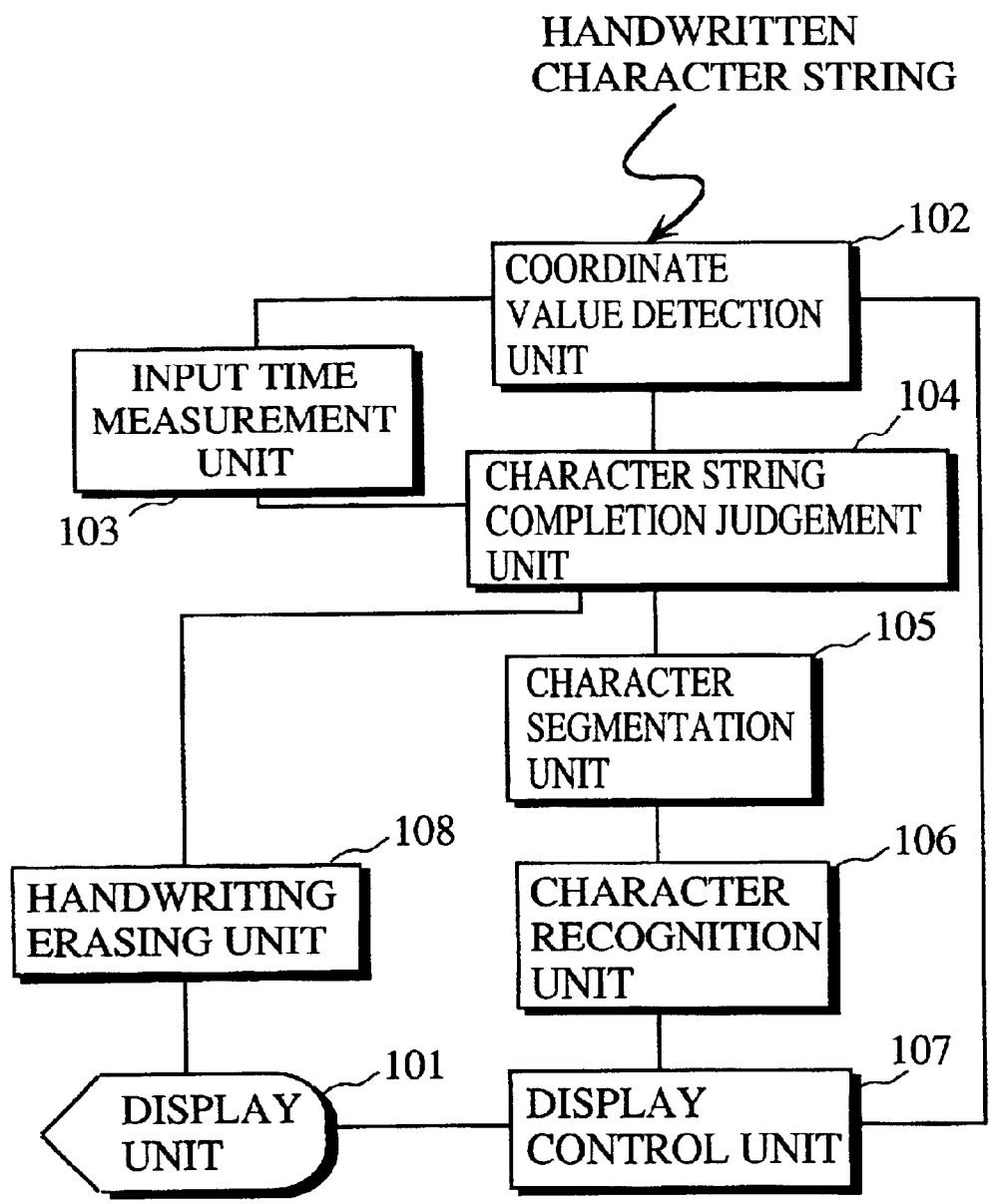
FIG. 1 is a block diagram of the first embodiment of the handwritten character recognition apparatus of the present invention.

FIG. 1 is a block diagram of a first embodiment of the handwritten character recognition apparatus of the present invention.

The handwritten character recognition apparatus includes a display unit 101, a coordinate value detection unit 102, an input time measuring unit 103, a character string completion judgement unit 104, a character segmentation unit 105, a character recognition unit 106, a display control unit 107, and a handwriting erasing unit 108.

Figure 2:
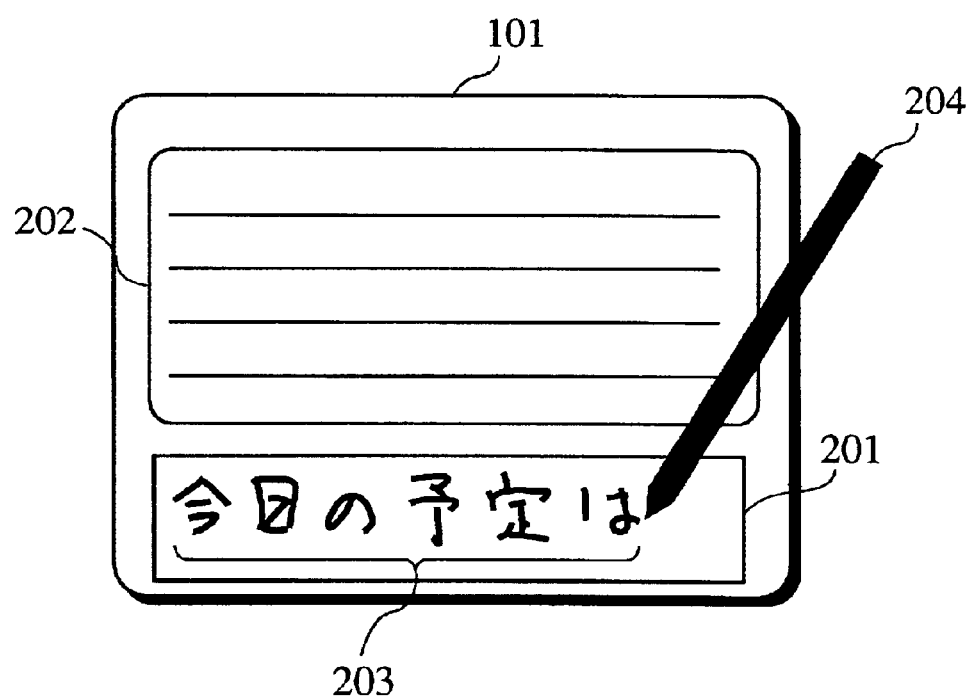
FIG. 2 is a drawing for explaining the input state of a handwritten character string of the handwritten character recognition apparatus of the above-described embodiment.

FIG. 2 shows an example of an outer view of the display unit of the handwritten character recognition apparatus.

The display unit 101 has a character string input area 201, and a recognition result display area 202. The recognition result display area 202 displays a recognition result of an input handwritten character string. A handwritten character string 203 is written on the character string input area by a user using a stylus 204.

The character string input area 201 is formed by laminating a transparent tablet on the display unit 101 which is a display such as an LCD display. The input handwritten character string 203 is displayed on the character string input area 201.

Figures 3, 4:
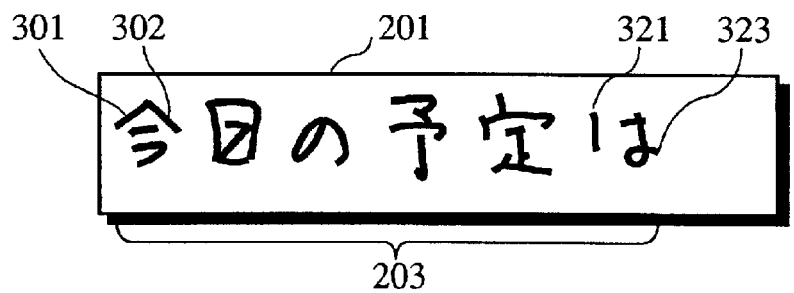
FIG. 3 is a drawing showing an example of a handwritten character string input into the character string input area of the above-described embodiment.
FIG. 4 is a drawing showing stroke information of the handwritten character string shown in FIG. 3, of which the coordinate value detection unit and the input time measurement unit notify the character string completion judgement unit, in the above-described embodiment.

FIG. 3 shows an example of a handwritten character string input into a character string input area.

While the user applies pressure to the character string input area (tablet) with the stylus 204, in other words while inputting a stroke that makes up a character, the coordinate value detection unit 102 detects coordinate values (X,Y) of a stroke at a predetermined time interval by which the characteristics of the stroke can be extracted. The coordinate value detection unit 102 successively notifies the character string completion judgment unit 104 and the display control unit 107 of the detected stroke coordinates.

The input time measurement unit 103, which has a clock, notifies the character string completion judgement unit 104 of the detection time (start time and end time) of the first coordinate and the last coordinate of the stroke detected by the coordinate value detection unit 102.

The character string completion judgement unit 104, which has a temporary storage unit, stores stroke information which includes the stroke coordinates notified by the coordinate value detection unit 102 and the detection time notified by the input time measurement unit 103.

FIG. 4 shows stroke information stored in the temporary storage unit of the character string completion judgement unit. The stroke information 401 corresponds to the handwritten character string 203 shown in FIG. 3.

The handwritten character string 203 is made up of stroke groups which are a collection of the strokes which form each character.

The stroke information 401 includes, for each stroke, a stroke number 402, a coordinate string 403, a start time 404, and an end time 405.

The coordinate string 403 is a row of coordinate values (X,Y), notified by the coordinate value detection unit 102, of the position of a stroke on the character string input area 201 at a predetermined interval, for example an interval of 0.05 seconds, from the start to the end of the input of the stroke.

The start time 404 is a time showing the detection time of the coordinate value of the first coordinate of each stroke. The end time 405 is a time showing the detection time of the coordinate value of the last coordinate of each stroke. Both the start time 404 and the end time 405 are notified by the input time measurement unit 103.

Please note that the stroke number 402 is given by the character string completion judgement unit 104 when the first coordinate of a stroke is notified by the coordinate value detection unit 102.

The stroke numbers 301, 302, 321, and 323 in the stroke information 401 correspond to the strokes of the handwritten character string 203 input into the character string input area 201 shown in FIG. 3.

Figure 5:
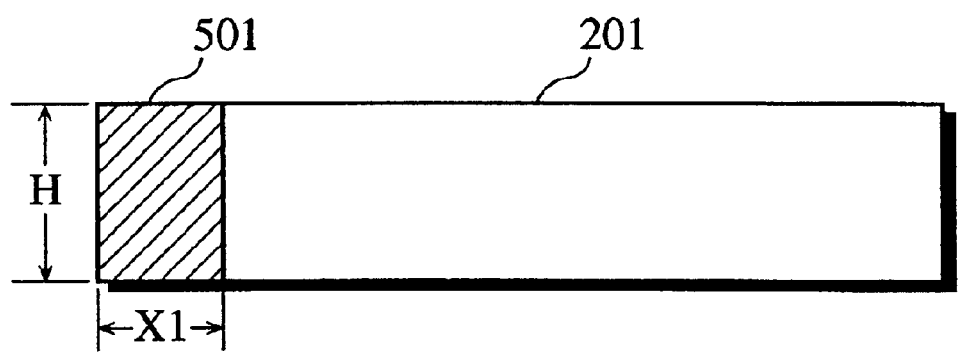
FIG. 5 is a drawing showing the first judgement area preset in the character string input area in the above-described embodiment.

Furthermore, the character string completion judgment unit 104, as shown in FIG. 5, already stores (a) the maximum value X1 of the X coordinate value of a first area 501 which is an area at the side of the character string input area 501 where writing of a handwritten character string starts (hereafter "start side") on the character string input area 201, and (b) a predetermined value D of the time difference between a detected start time S of the first coordinate of a stroke being input (hereafter "current stroke") and a detected end time E of the last coordinate of a stroke input immediately preceding the current stroke (hereafter "immediately preceding stroke").

The width X1 of the first area 501 is slightly smaller that the width of one character of a handwritten character string. For example, X1 is set at a width 0.7 times the height H of the character string input area 201.

Furthermore, the value D of the predetermined time difference is set, for example, at 1 second.

The character string completion judgement unit 104 calculates the time difference S minus E (S−E) of the start time S notified by the input time measurement unit 103 of a current stroke, and the end time E of an immediately-preceding stroke, and judges whether the value is at least the pre-stored predetermined time difference D. If the judgement is affirmative, the character string completion judgement unit 104 further judges whether the X value of the coordinate value (X,Y) of the first coordinate of the current stroke notified by the coordinate value detection unit is at least X1. If the judgement is affirmative, the character string completion judgement unit 104 notifies the character segmentation unit 105 of the stored stroke information 401 of the handwritten character string input immediately preceding.

Furthermore, the character string completion judgement unit 104 notifies the handwriting erasing unit 108 of the same stroke information 401, and instructs the erasing of the handwritten character string displayed on the character string input area 201 of the display unit 101. The character string completion judgement unit 104 deletes the notified stroke information 401 from the temporary memory unit.

The character segmentation unit 105 receives the stroke information 401 from the character string completion judgement unit 104, segments the stroke group into the character pattern of each character, and notifies the character recognition unit 106.

The character recognition unit 106, which has a dictionary, recognizes each character from each character pattern notified by the character segmentation unit 105, and notifies the display control unit 107 of the recognition result of the handwritten character string.

The display control unit 107 links the coordinates (X,Y) notified by the coordinate value detection unit 102 in order by line segments on the character string input area 201 of the display unit 101, and displays the input handwritten character string.

The display control unit 107 displays the character string which is the recognition result of the handwritten character string notified by the character recognition unit 106 on the recognition result display area 202.

The handwriting erasing unit 108 receives the stroke information 401 from the character string completion judgement unit 104 and erases the stroke groups included in the stroke information 401 that are displayed on the character string input area 201.

Figure 6:
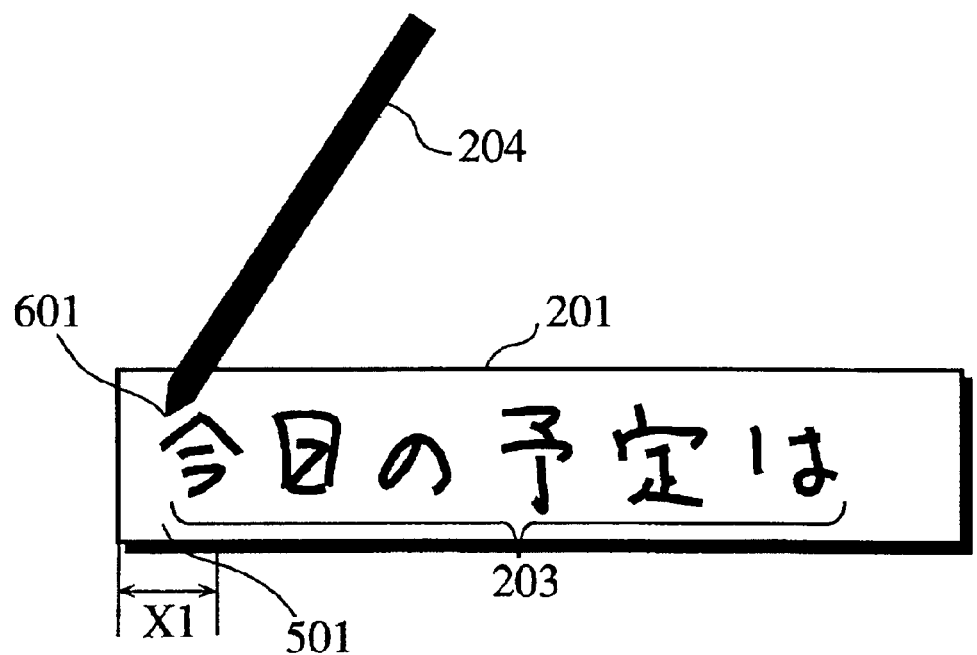
FIG. 6 is a drawing showing a state when a handwritten character string is input into the character string input area in the above-described embodiment.

As shown in FIG. 6, after the handwritten character string 203 is input, when a next handwritten character string is input by the user using the stylus 204 in the first area 205 of the character string input area 201, the first coordinate (X51,Y51) of the first stroke 601 is detected by the coordinate value detection unit 102. In addition, the start time measuring unit 103 detects the start time S5.

The stroke information stored in the temporary storage unit of the character string completion judgement unit 104 changes from the information shown in FIG. 4 to that shown in FIG. 7.

The character string judgement unit 104 refers to the stroke information 701, calculates a time difference S5 minus E4 (S5−E4) between a start time S5 of the stroke 601 and an end time E4 of the stroke 323, and judges whether the time difference is at least the predetermined time difference D. If the judgement is affirmative, the character string judgement unit 104 judges whether the X coordinate value of the first coordinate (X51,Y51) of the stroke 601 is X51≦X1. If so, the stroke 601 is judged to have been input into the first area 501.

The character string completion judgment unit 104 judges that the strokes 301 to 323 in the stroke information 701 are a stroke group of a handwritten character string whose input is complete, and notifies the character segmentation unit 105 and the handwriting erasing unit 108 of the stroke information 401 of the strokes 310 to 323.

Figure 8:
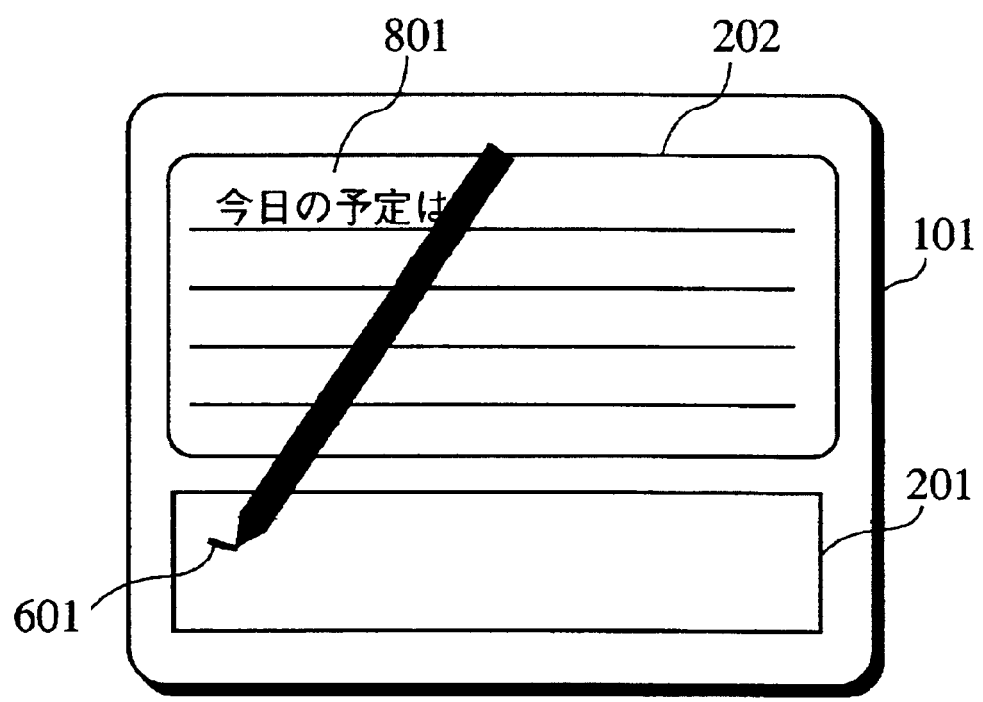
FIG. 8 is a drawing showing a recognition result of a handwritten character string of the above-described embodiment.
Figure 9A:
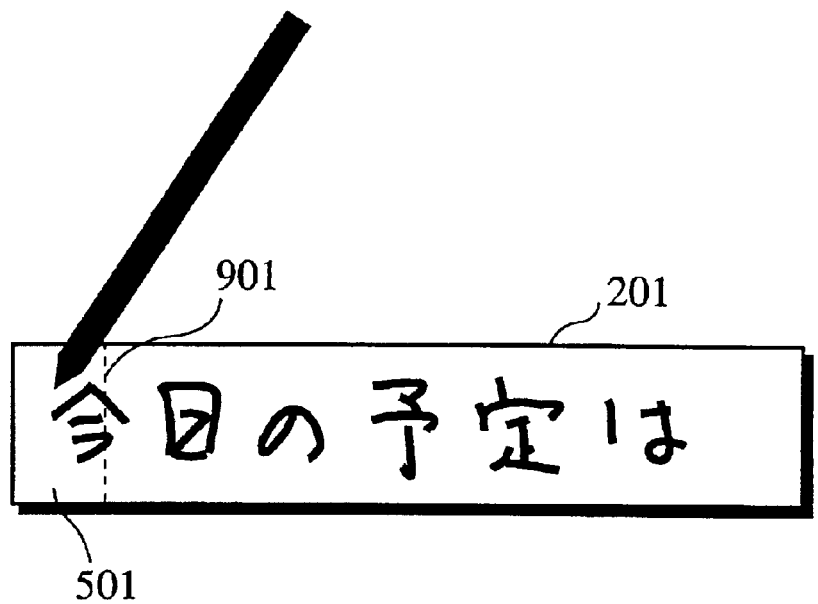
FIG. 9A is a drawing showing a display example of the first judgement area in the above-described embodiment.

According to this, the character segmentation unit 105 segments the character pattern of each character from the strokes 310 to 323, and notifies the component recognition unit 106. The recognition result of the character recognition unit 106, as shown in FIG. 8, is displayed as a character string 801 on the recognition result display area 202 of the display unit 101. In addition, the handwritten character string 203 displayed on the character string input area 201 is erased by the handwriting erasing unit 108, and the stroke 601 of the new handwritten character string is displayed by the display control unit 107. Please note that the control display unit 107 may display so that the user can visually identify the first area 501 which is the input start area of the character string input area 201 of the display unit 101. In FIG. 9A, the position of X1 from the start side of the character string input area 201 is displayed by a broken line 901 so the first area 501 is distinguishable.

Figure 9B:
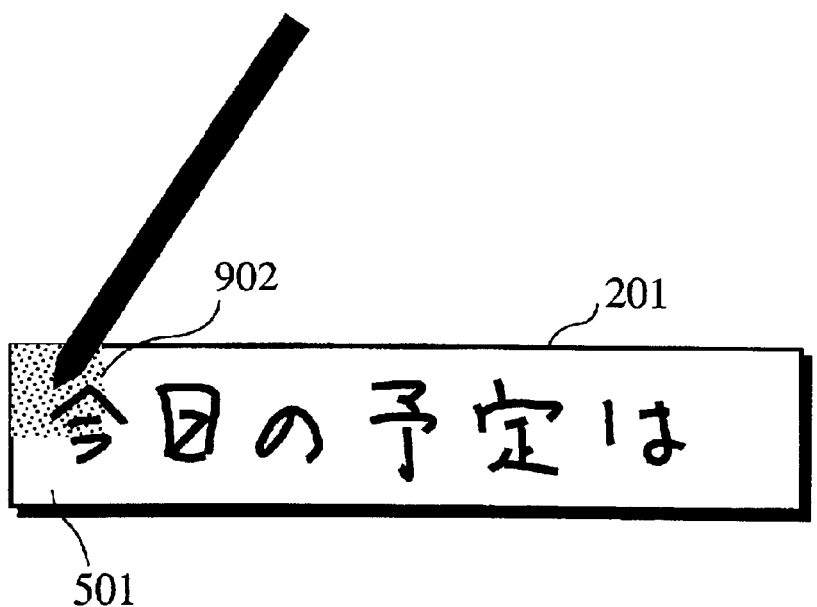
FIG. 9B is a drawing showing another display example of the first judgement area in the above-described embodiment.

In FIG. 9B, the top half of the first area 501 is displayed with a background pattern 902. Alternatively, the first area 501 and the remainder of the character string input area 201 may be displayed with different colors.

Figure 10:
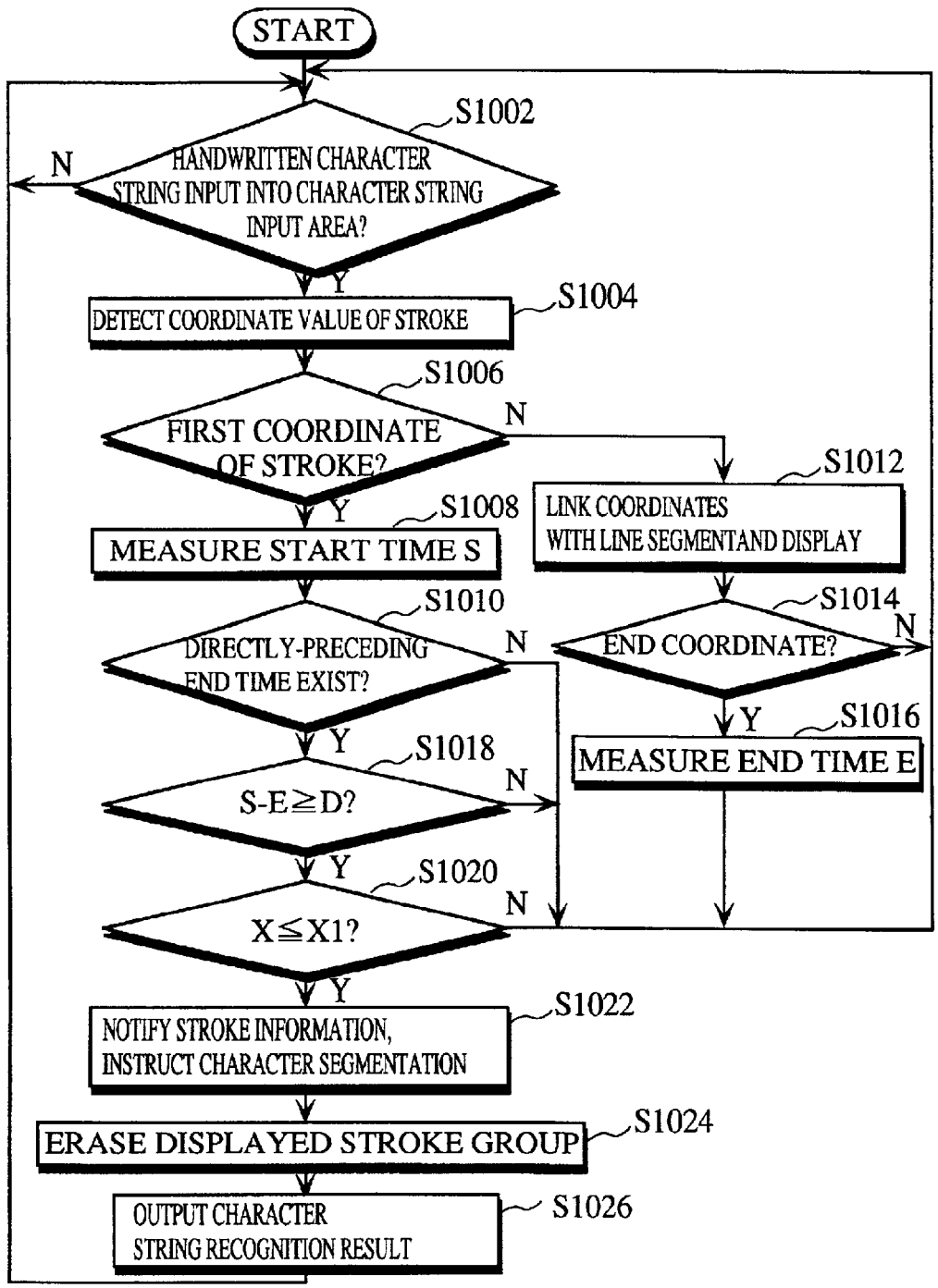
FIG. 10 is a flowchart for explaining the operations of the present embodiment.

Next, the operations of the present embodiment will be explained using the flowchart shown in FIG. 10.

First, the coordinate value detection unit 102 waits for input of a handwritten character string into the character string input area 201 by the user (S1002), detects the coordinates (X,Y) of a stroke on the character string input area 201, and notifies the character string completion judgement unit 104 and the display control unit 107 (S1004). The coordinate value detection unit 102 judges whether the detected coordinate value is the first coordinate of the stroke (S1006), and if the judgement is affirmative, instructs the input time measurement unit 103 to measure the input time.

The input time measurement unit 103 measures the start time S, and informs the character string completion judgement unit 104 (S1008).

The character string completion judgement unit 104 judges whether there is an end time of a last coordinate immediately before in the stroke information 401 (S1010) If the judgement is negative the apparatus returns to S1002.

At S1006, when the detected coordinate is not a first coordinate (in other words, when the detected coordinate is an interim coordinate or a last coordinate), the display control unit 107 links the current coordinate and the immediately preceding coordinate by a line segment and displays the linked coordinates on the character input area 201 (S1012).

The coordinate detection unit 102 judges whether a detected coordinate is the last coordinate of the stroke (S1014), and the apparatus returns to S1002 if the judgement is negative, or the coordinate detection unit 102 instructs the measurement of the input time to the input time measurement unit 103 if the judgement is affirmative.

The input time measurement unit 103 measures the end time of the last coordinate of the stroke, informs the character string completion judgement unit 104 (S1016), and the apparatus returns to S1002.

When the judgement at S1010 is affirmative, the character string completion judgement unit 104 judges whether the difference between the start time S and the end time E is at least the predetermined time difference D (S1018), if the judgement is negative the apparatus returns to S1002, or if the judgement is affirmative the character string completion judgement unit 104 judges whether the X coordinate value of the first stroke is no more than the width X1 of the first area (S1020). If the judgement is negative, the character string completion judgement unit 104 judges the handwritten character string to be in the process of being input and returns to S1002. If the judgement is affirmative, the character string completion judgement unit 104 notifies the character segmentation unit 105 of the stroke information 401, and instructs the character segmentation, together with instructing the handwriting erasing unit 108 to erase the strokes in the character string input area 201 (S1022).

The handwriting erasing unit 108 erases the handwritten character string (stroke groups) displayed on the character string input area 201 whose input is complete (S1024).

The character segmentation unit 105 segments the character pattern of each character from the notified stroke information, and notifies the character recognition unit 106. The character recognition unit 106 recognizes each character from each character pattern, and informs the display control unit 107 of the character string which is the recognition result. The display control unit 107 displays the character string on the recognition result display area 202 (S1026), and the apparatus returns to S1002.

Please note that in the present embodiment the character string completion judgement unit 104 pre-stores the set width X1 of the first area 501 and the predetermined time difference D, but as the size of characters and speed of writing differs from person to person when inputting a handwritten character string, a receiving unit may be provided for setting the width X1 and the value D stored in the character string completion judgement unit 104, and the user may set these values.

As explained above, according to the present embodiment, when a predetermined input time of a first handwritten character string passes, at the point of a second character string being input into the predetermined first area, it is possible to judge whether input of the first character string is complete by judging a break in the first input character string without the user indicating character string input completion. Therefore, a user can input handwritten characters continuously in a handwritten character recognition apparatus that does not have a frame for inputting one character at a time.

Second Embodiment

Figure 11:
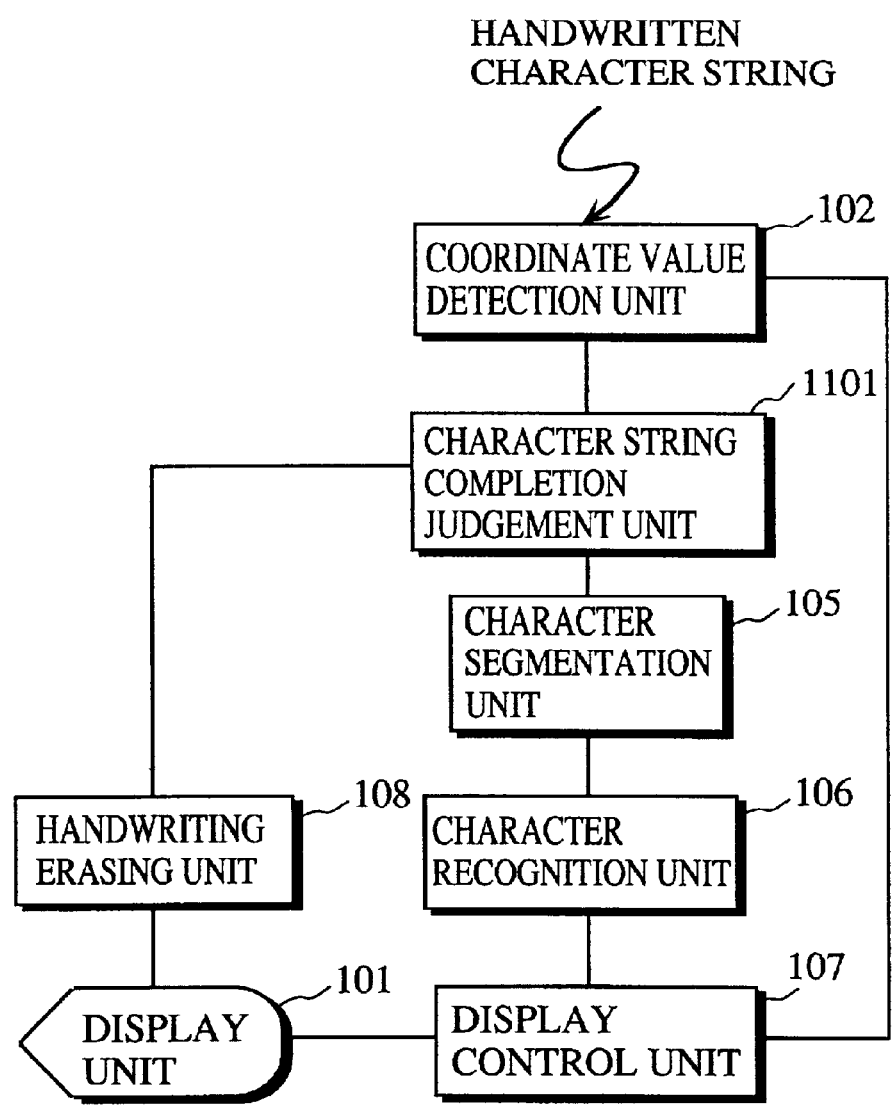
FIG. 11 is a block drawing of the second embodiment of the handwritten character recognition apparatus of the present invention.

FIG. 11 is a block diagram of a second embodiment of the handwritten character recognition apparatus of the present invention.

The handwritten character recognition apparatus includes a display 101, a coordinate value detection unit 102, a character string completion judgement unit 1101, a character segmentation unit 105, a character recognition unit 106, a display control unit 107, and a handwriting erasing unit 108. Please note that constituent elements that are the same as those in the above-described first embodiment have the same numbering. Only the constituent elements unique to the present embodiment will be described.

Figure 12:
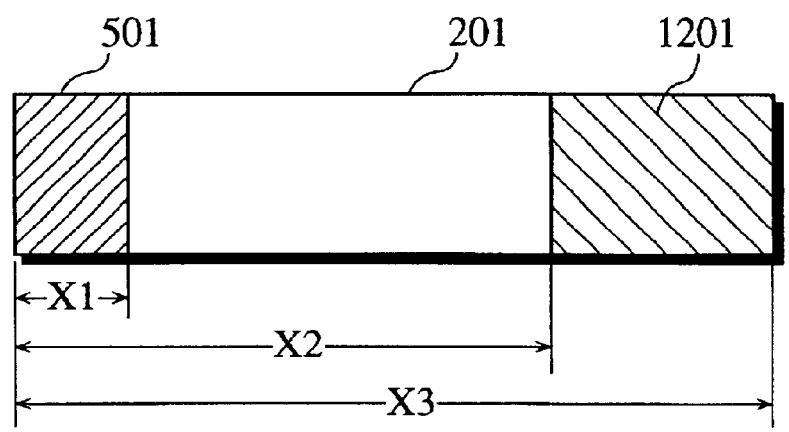
FIG. 12 is a drawing showing the preset first area and second area of the character string input area of the above-described embodiment.

The character string completion judgement unit 1101 stores in advance the width X1 of the first area 501 and a distance X2 as shown in FIG. 12. X2 is the distance from the start side of the first area 501 to the start of a second area 1201. The second area 1201 is an input end area at the opposite end of the character string input area 201 to the first area 501. The first area 501 is identical to that in the above-described first embodiment.

The second area 1201 is an area where the last character of a handwritten character string is expected to be input, and is an area which is a greater distance from the start side of the character string input area 201 than the distance X2. Please note that the distance X2 is, for example, approximately half a width X3 of the character string input area 201.

Figure 13:
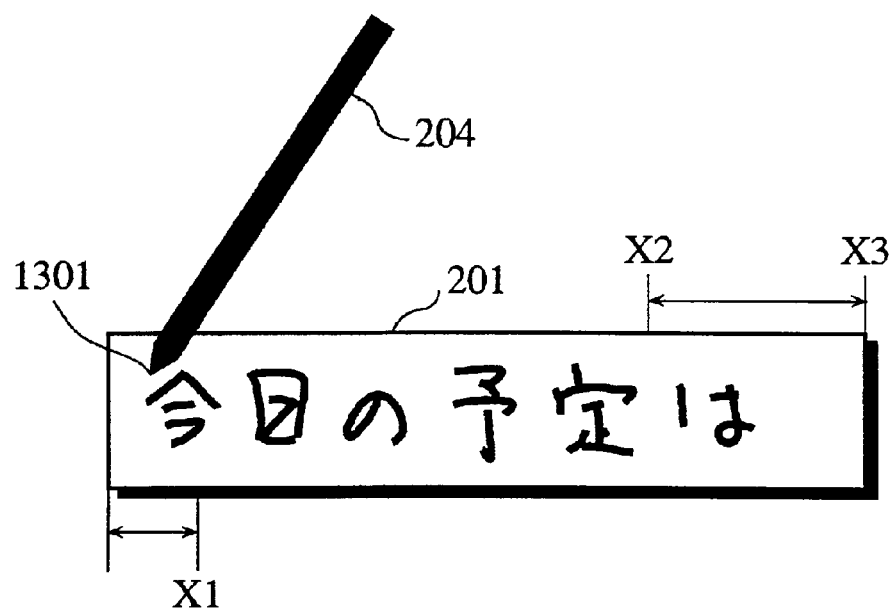
FIG. 13 is a drawing showing a state when a handwritten character string is input into the character string input area in the above-described embodiment.

When the first character of a handwritten character string is input by the user using the stylus 204 into the first area 501 of the of the character string input area 201, as shown in FIG. 13, the coordinate value detection unit 102 detects a coordinate value (X51,Y51) of the first coordinate of a stroke 1301.

Figure 14:
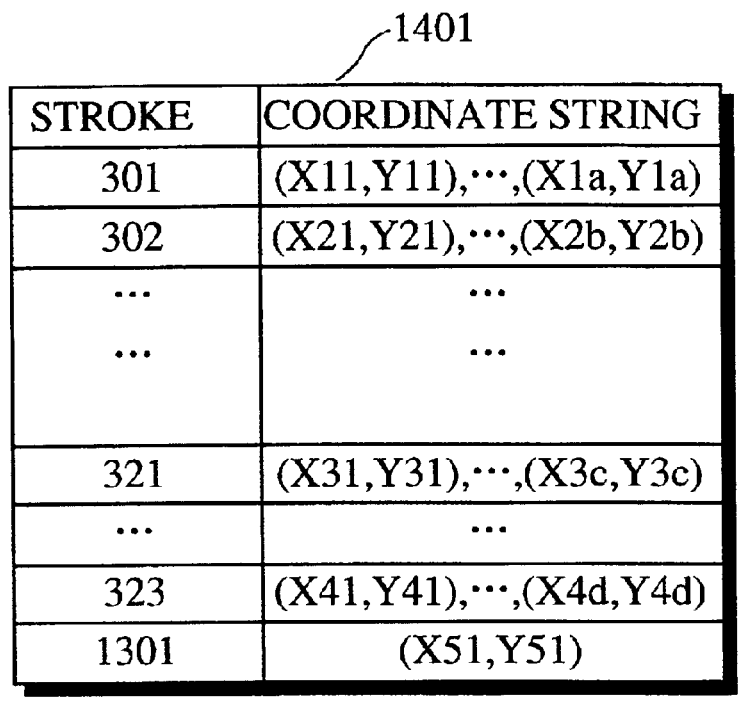
FIG. 14 is a drawing showing an example of the stroke information notified to the character string completion judgement unit by the coordinate value detection unit of the above-described embodiment.

As a result, the temporary storage unit of the character string completion judgement unit 1101 stores the stroke information shown in FIG. 14.

The character string completion judgement unit 1101, is notified of the start coordinate (X51,Y51) of the stroke 1301 in the stroke information 1401 and judges whether there is a stroke coordinate string immediately preceding the stroke 1301. A coordinate string of a stroke immediately preceding the stroke 1301 is judged to exist because a coordinate string (X41,Y41), . . . , (X4d,Y4d) of a stroke 323 is stored in the character string completion judgement unit 1101.

Next, the character string completion judgement unit 1101 judges whether the X coordinate value X41 of the first coordinate (X41,Y41) of the immediately preceding stroke 323 is at least X2. If the judgement is affirmative, the immediately preceding stroke 323 is judged to have been input into the second area 1201, which is the input end area, and the character string completion judgement unit 1101 judges whether the X coordinate value X51 of the first coordinate (X51,Y51) of the stroke 1301 being input is X1 or less. If the judgement is affirmative, the stroke groups up to and including the immediately preceding stroke 323 is judged to be a completed handwritten character string.

Figure 15:
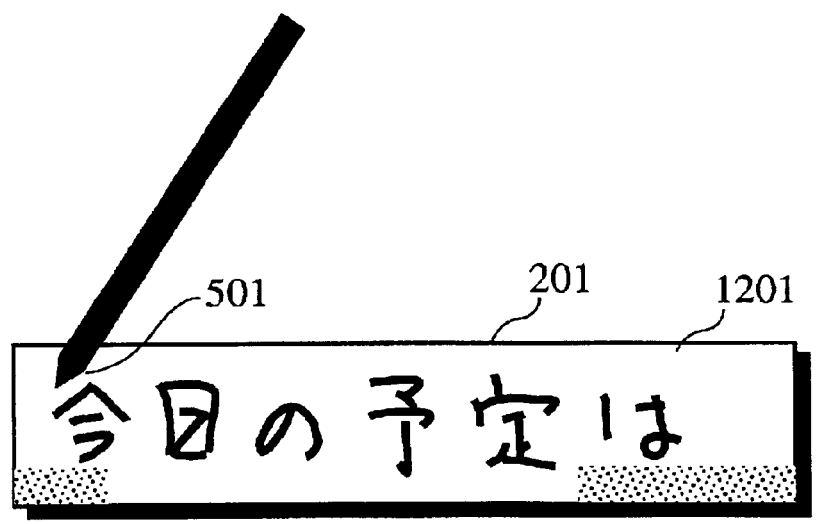
FIG. 15 is a drawing showing a display example of the first area and the second area of the above-described embodiment.

The display control unit 107, as shown in FIG. 15, performs display control of the display unit 101 giving a different background pattern or color to the first area 501 and the second area 1201 of the character string input area 201 so that the user can visually recognize the areas.

Figure 16:
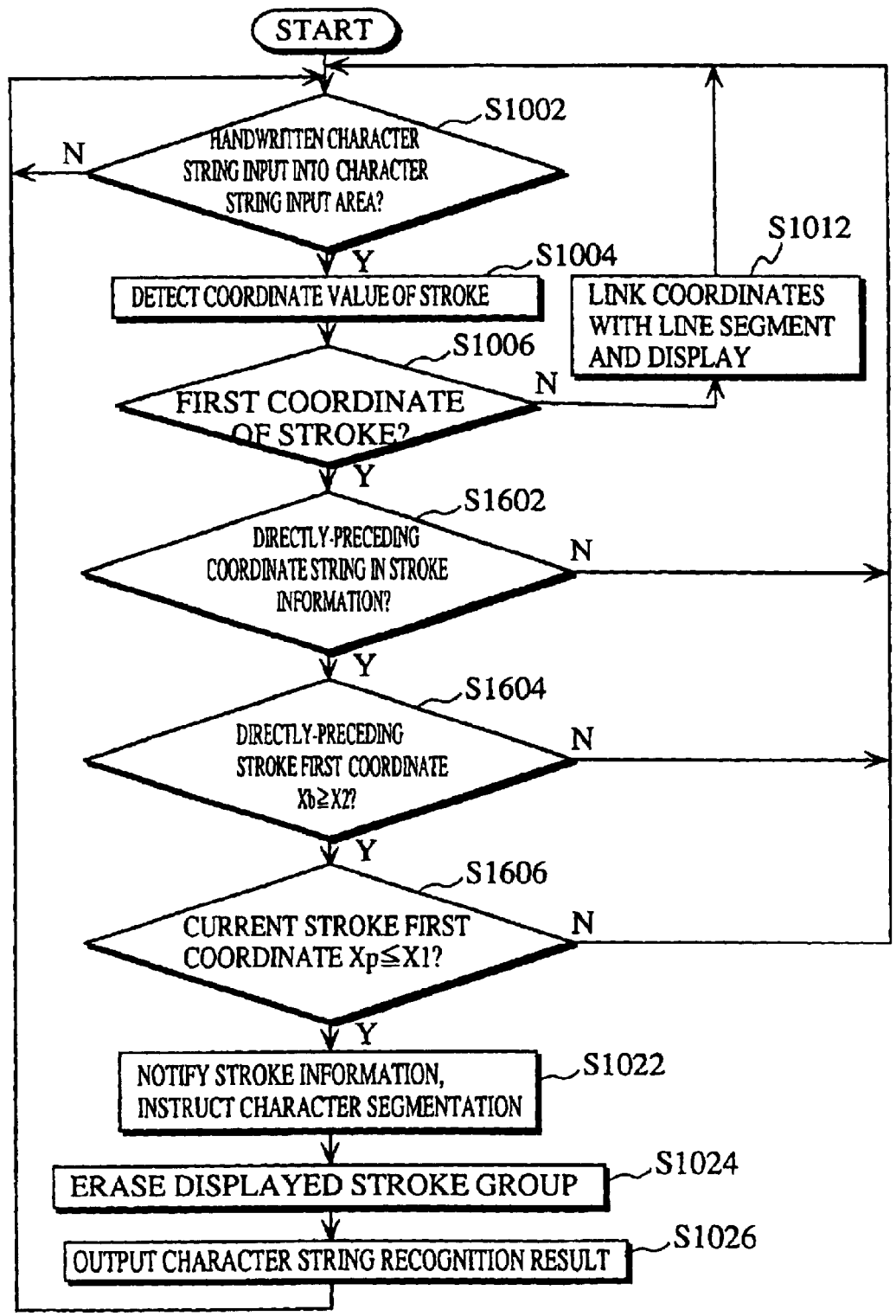
FIG. 16 is a flowchart for explaining the operations of the present embodiment.

The following explains the operations of the present embodiment using the flowchart in FIG. 16. Please note that steps that are the same as those in the above-described first embodiment have the same numbering, and an explanation of these steps will be omitted.

At S1006 the character string input completion judgement unit 1101 judges whether a coordinate is the a first coordinate of a stroke, and if the judgment is affirmative, judges whether a coordinate string of an immediately preceding stroke is stored in the stroke information 1401 stored in the temporary storage unit (S1602) If the judgement is negative the apparatus returns to S1002. If the judgement is affirmative, the character string input completion judgement unit 1101 judges whether the X coordinate value Xb of the first coordinate of the immediately preceding stroke is $Xb \geq X2$ (S1604).

If the judgement is negative the apparatus returns to S1002, and if the judgement is affirmative, the character string input completion judgement unit 1101 judges whether the X coordinate value Xp of the start coordinate of the current stroke is $Xp \leq X1$ (S1606). If the judgement is affirmative, the apparatus proceeds to S1022.

As explained above, in the present embodiment, when a current handwritten character string is input into the first area 501, if a first coordinate of a stroke of a handwritten character string is input into the second area 1201 immediately preceding the handwritten character string, the character string input completion judgement unit 1101 judges this to be a break between character strings, and begins to recognize the immediately preceding hand written character string. Therefore, as the apparatus is able to judge the completion of the input of a character string without instruction from the user, a user is able to input a handwritten character string continuously in a handwritten character recognition apparatus that does not have a character frame for inputting one character at a time.

Please note that the present embodiment also includes the input time measurement unit 103 of the above-described first embodiment. In addition, the character string completion judgement unit 1101 may judge the input of an immediately preceding handwritten character string to be complete when a time difference between a detected end time of the last coordinate of a stroke and a detected start time of the first coordinate of another stroke in the first area 501 is of at least a predetermined time, and the first coordinate of the input immediately preceding stroke is in the second area 1201. Alternatively, the input of the immediately preceding character string may be judged to be complete when either of these situations apply.

Third Embodiment

Figure 17:
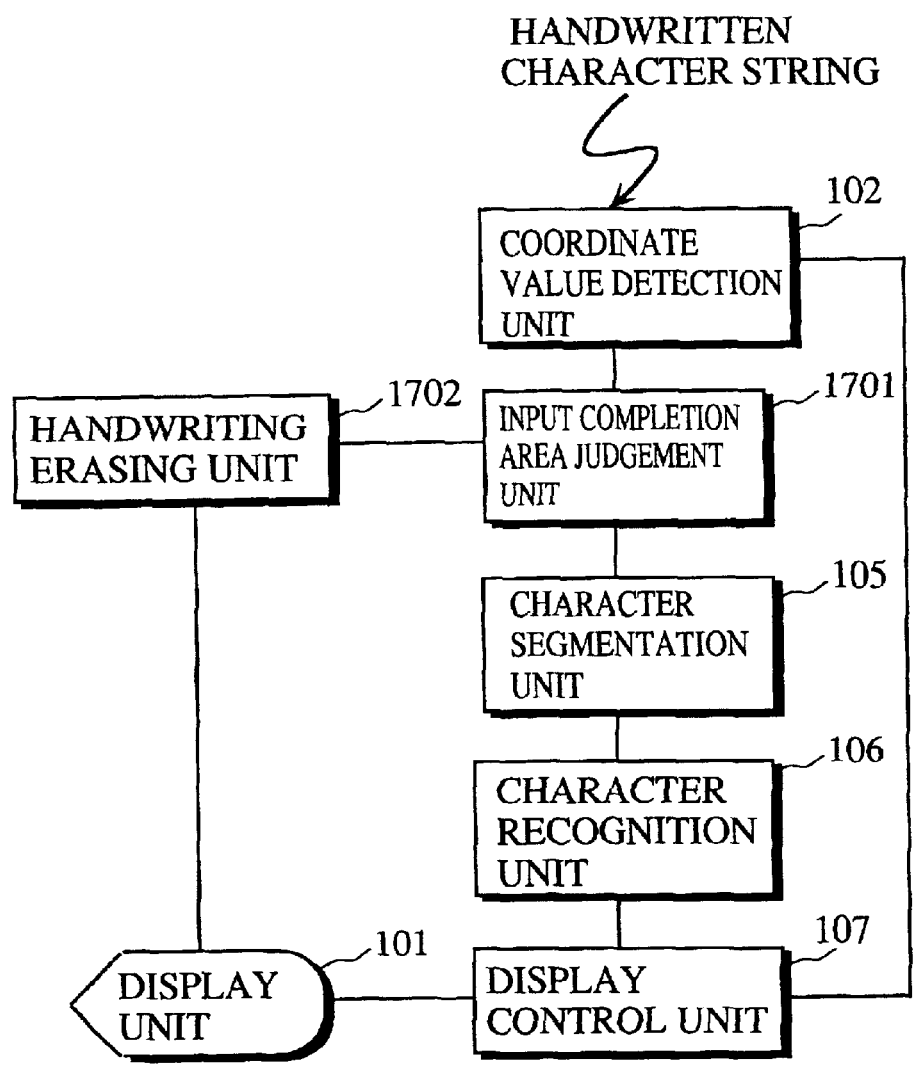
FIG. 17 is a block drawing of the third embodiment of the handwritten character recognition apparatus of the present invention.

FIG. 17 is a block diagram of a third embodiment of the handwritten character recognition apparatus of the present invention.

The handwritten character recognition apparatus includes a display unit 101, a coordinate value detection unit 102, an input completion area judgement unit 1701, a character segmentation unit 105, a character recognition unit 106, a display control unit 107, and a handwriting erasing unit 1702. Please note that constituent elements that are the same as those in the above-described first embodiment have the same numbering, and an explanation of these constituent elements will be omitted.

The input completion area judgement unit 1701 pre-stores a width X4 for judgment area setting for judging whether input of a handwritten character string is complete. The width X4 is a constant which prescribes a judgement area in the character string input area 201 that is a distance X4 or more from the last coordinate of a current character. The width X4 is, for example, half of the whole width X3 of the character string input area 201.

FIGS. 18A to FIG. 18D are drawings for explaining the judgment area.

Figure 18A:
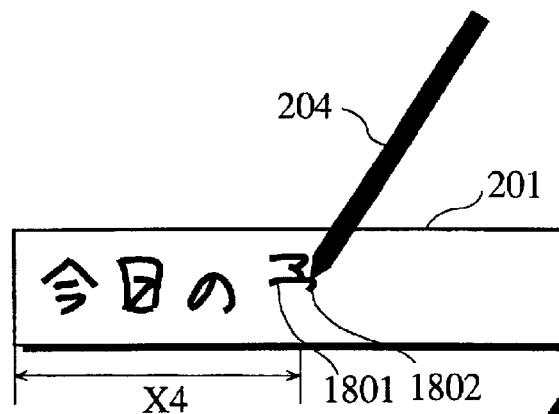
FIGS. 18A to 18D are drawings for explaining the input area set by the input completion area judgement unit in the above-described embodiment.

As shown in FIG. 18A, an area which is at least the distance X4 from the last coordinate 1802 of the current stroke 1801 is set as the judgement area in a direction towards the start side. A judgement area is not set when the last coordinate is less than the distance X4 from the start side of the character string input area 201.

Figure 18B:
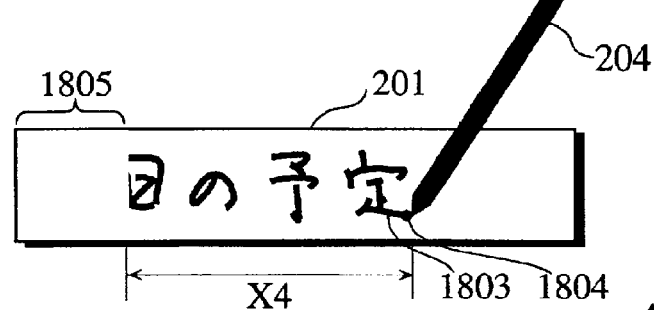

As shown in FIG. 18B, the judgement area 1805 is set a distance which is at least X4 starting from the last coordinate 1804 of the current stroke 1803 in the direction of the start side of the character string input area 201.

Figure 18C:
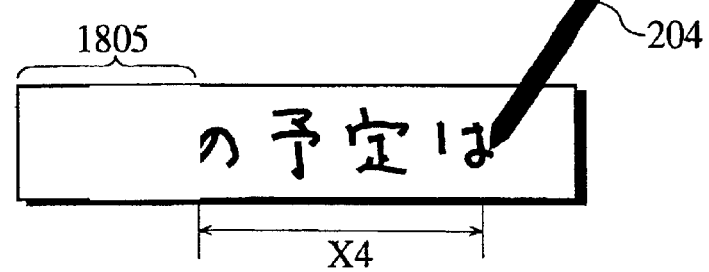

As shown in FIG. 18C, as the user inputs the handwritten character string, the judgement area 1805 widens.

Figure 18D:
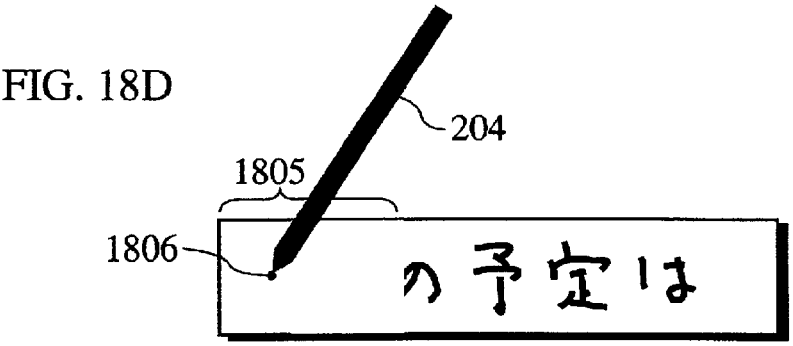

As shown in FIG. 18D, when a first coordinate 1806 of a stroke in the judgement area 1805 is detected by the coordinate value detection unit 102, the input completion area judgement unit 1701 judges the input of the handwritten character string inputted previously to be complete.

Please note that in order for the judgement area 1805 to be visually recognizable by the user, the handwriting erasing unit 1702 erases the line segments which make up the strokes shown in the judgement area 1805.

The input completion area judgement unit 1701, when successively notified of coordinates of a stroke of a handwritten character string by the coordinate value detection unit 102, stores information such as the stroke information 1401 shown in FIG. 14 in the temporary storage unit.

The input completion area judgment unit 1701 is notified of a last coordinate of a stroke, and subtracts the width X4 from the X coordinate XE of the last coordinate. When $XE-X4 \geq 0$, the input completion area judgment unit 1701 informs the handwriting erasing unit 1702 of the value of XE-X4.

Furthermore, the input completion area judgment unit 1701, when notified of a first coordinate of a stroke, judges whether there is an immediately preceding stroke in the stroke information 1401. If the judgement is affirmative the input completion area judgment unit 1701 calculates, from the X coordinate value XS of the first coordinate and the X coordinate value XE of the last coordinate of the immediately preceding stroke, whether an equation $XS \leq XE-X4$ stands. Namely, if the equation stands the input completion area judgment unit 1701 judges the first coordinate of the stroke to be in the judgement area 1805.

The input completion area judgment unit 1701, when the first coordinate 1806 of the stroke is judged to be in the judgement area 1805, judges the input of the previous character string to be complete, informs the character segmentation unit 105 of the corresponding stroke information, and deletes the information from the temporary storage unit. The input completion area judgment unit 1701 instructs the handwriting erasing unit 1702 to erase line segments displayed in the character string input area excluding those in the judgment area 1805.

The handwriting erasing unit 1702 receives the XE-X4 value from the input completion area judgement unit 1701 and deletes the line segments displayed on the judgement area 1805 of a width of XE−X4 starting from the start side of the character string input area. Furthermore, when the handwriting erasing unit 1702 receives an instruction from the input completion area judgement unit 1701 to erase line segments other than those in the judgement area 1805, the handwriting erasing unit 1702 erases line segments displayed on the character string input area 201, excluding the line segments in the judgement area 1805.

Figure 19:
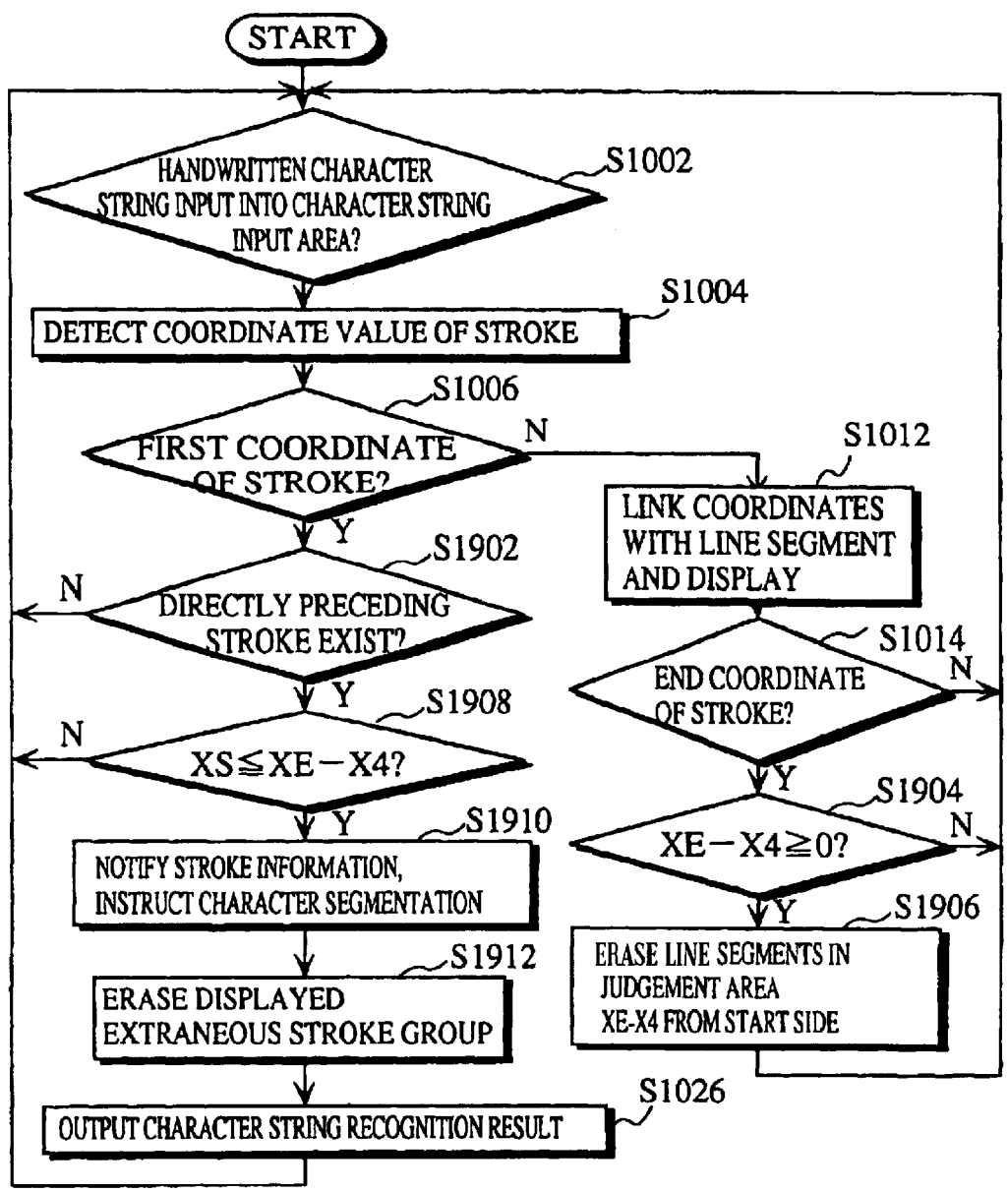
FIG. 19 flowchart for explaining the operations of the present embodiment.

Next, the operations of the present embodiment will be explained using the flowchart in FIG. 19. Please note that steps that are the same as those in the above-described first embodiment have the same numbering, and an explanation of these steps will be omitted.

The input completion area judgement unit 1701 judges whether the coordinate detected by the coordinate value detection unit 102 is a first coordinate of a stroke (S1006), and if the judgement is affirmative, judges whether an immediately preceding stroke is stored in the stroke information (S1902). If the judgement is negative the apparatus returns to S1002.

If the input completion area judgement unit 1701 judges a detected coordinate to be a last coordinate at S1014, the input completion area judgement unit 1701 subtracts the pre-stored width X4 from the X coordinate value XE of the last coordinate and judges whether the result is 0 or greater (S1904). The apparatus returns to S1002 if the judgement is negative. The input completion area judgement unit 1701 notifies the handwriting erasing unit 1702 of the value of XE−X4 if the judgement is affirmative.

The handwriting erasing unit 1702 erases the line segments displayed on the judgement area 1805 which is a width XE−X4 from the start side of the character string input area 201 (S1906).

The input completion area judgement unit 1701, if an immediately preceding stroke is judged to exist in the stroke information at S1902, calculates whether an equation $XS \leq XE-X4$, which comes from the X value XS of the start coordinate of the stroke, the X coordinate XE of the X coordinate value of the end coordinate of the immediately preceding stroke, and the width X4, stands. According to this, the input completion area judgement unit 1701 judges whether the start coordinate of the stroke is within the judgement area 1805 (S1908). If the equation does not stand, the start coordinate is not within the judgement area 1805, and the apparatus returns to S1002. If the equation does stand, the start coordinate is within the judgement area 1805, so the input completion area judgement unit 1701 notifies the character segmentation unit 105 of the previously notified stroke information, and instructs the handwriting erasing unit 1702 to erase the remaining stroke group which is displayed in the character string input area 201 (S1910).

The handwriting erasing unit 1702 erases the remaining stroke groups displayed on the character string input area 201, excluding those on the judgement area 1805 (S1912), and the apparatus proceeds to S1026.

As explained above, in the present embodiment, by erasing the display of strokes that are at least a set distance from the end coordinate of the stroke of the handwritten character string input by the user, the erased area is shown to the user as the judgement area 1805, and if there is a new input of a handwritten character string in the judgement area 1805, the apparatus can begin to recognize the immediately preceding input handwritten character string.

Please note that the constructions of the first to the third embodiments are shown in FIG. 1, FIG. 11, and FIG. 17 respectively, but the function of each constituent element may be described in a program which allows a computer to perform the functions. The program may be received and transmitted via a network and put into application as a handwritten character recognition apparatus.

Furthermore, the program may be recorded on a computer-readable recording medium and put into application as a handwritten character recognition apparatus which has a character string input area which does not have an input frame for inputting one character at a time.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A portable handwritten character recognition apparatus having a character string input area of a size that allows a plurality of characters to be handwritten thereon for a user to input a handwritten character string, said apparatus comprising:

a coordinate string detection unit that detects a coordinate string of each stroke that makes up an input handwritten character string in the character string input area, the character string input area being composed of a single frame in which one or more handwritten characters are recognized;

an input completion judgement unit that judges, when a first coordinate of one of the strokes is detected in a first area which is at a side of the character string input area where writing of the handwritten character string starts, whether an input of an immediately preceding handwritten character string is complete; and a segmentation recognition unit that segments, when said input completion detection unit judges the input to be complete, stroke strings for each character from all the strokes of the immediately preceding handwritten character string, recognizes each character, and outputs a character string which is a recognition result;

wherein said input completion judgment unit includes:

a first coordinate judgement unit that judges, when an X value of a first coordinate of a stroke is X1 or less, X1 being a width of the first area, that the first coordinate is in the first area.

2. A portable handwritten character recognition apparatus according to claim 1, further comprising:

a display unit that successively displays strokes by linking coordinates detected by said coordinate value detection unit by line segments; and a first area display control unit that controls a display state of said display unit so as make the first area and the second area visually recognizable, wherein said coordinate string detection unit comprises a transparent tablet, and wherein said display unit is positioned under said display tablet.

3. A portable handwritten character recognition apparatus according to claim 1, wherein the input completion judgement unit further includes an X1 setting unit that receives a value of X1 according to a size of a handwritten character written by the user, and wherein said first coordinate judgement unit judges according to the received value of X1.

4. A portable handwritten character recognition apparatus according to claim 1, wherein said input completion judgement unit includes:

an input time measurement unit that measures a first input time which is an input time of a first coordinate of each stroke, and a second input time which is an input time of a last coordinate of each stroke; and a time judgement unit that judges, when a time difference between the first input time of a stroke and a second input time of an immediately preceding stroke is at least a predetermined time, that the input of the immediately preceding handwritten character string is complete.

5. A potable handwritten character recognition apparatus according to claim 4, wherein said input completion judgement unit further includes:

a judgement time setting unit that receives a setting of a predetermined time according to a speed of input of handwriting of the user, the time judgement unit judging that the input of the immediately preceding handwritten character string is complete when the input thereof ceases for at least the predetermined time.

6. A potable handwritten character recognition apparatus according to claim 1, wherein the input completion judgement unit includes:

a stroke area judgement unit that judges that the input of the immediately preceding character string is complete when a first coordinate of a stroke thereof is in a second area which is an area at the opposite side of the character string input area to the first area.

7. A portable handwritten character recognition apparatus according to claim 6, further comprising:

a display unit, positioned under a transparent tablet which makes up the character string input area, that successively displays strokes by linking the coordinates of each coordinate string detected by said coordinate string detection unit by line segments; and an area display control unit that controls a display state of said display unit so as to make the first area and the second area visually recognizable.

8. A portable handwritten character recognition apparatus according to claim 1, further comprising:

a display unit that display a stroke by linking the coordinates of each coordinate string successively detected by said coordinate string detection unit; and an erasing unit that erases all strokes that make up the immediately preceding handwritten character string when said input completion judgement unit judges the input thereof to be complete.

9. A program for use with a handwritten character recognition apparatus having a character string input area of a size that allows a plurality of characters to be handwritten thereon for a user to input a handwritten character string, the program including apparatus readable instructions capable of instructing a handwritten character recognition apparatus to:

detect a coordinate string of each stroke that makes up an input handwritten character string in the character string input area, the character string input area being composed of a single frame in which one or more handwritten characters are recognized;

judge, when a first coordinate of one of the strokes is detected in a first area which is at a side of the character string input area where writing of the handwritten character string starts, whether an input of an immediately preceding handwritten character string is complete, and judge, when an X value of a first coordinate of a stroke is X1 or less, X1 being a width of the first area, that the first coordinate is in the first area; and segment, when the input is judged to be complete, stroke strings for each character from all the strokes of the immediately preceding handwritten character string, recognize each character, and output a character string which is a recognition result.

10. A computer-readable recording medium for use with a handwritten character recognition apparatus having a character string input area of a size that allows a plurality of characters to be handwritten thereon for a user to input a handwritten character string, the medium having recorded thereon, apparatus readable instructions capable of instructing a handwritten character recognition apparatus to:

detect a coordinate string of each stroke that makes up an input handwritten character string in the character string input area, the character string input area being composed of a single frame in which one or more handwritten characters are recognized;

judge, when a first coordinate of one of the strokes is detected in a first area which is at a side of the character string input area where writing of the handwritten character string starts, whether an input of an immediately preceding handwritten character string is complete, and judge, when an X value of a first coordinate of a stroke is X1 or less, X1 being a width of the first area, that the first coordinate is in the first area; and segment, when the input is judged to be complete, stroke strings for each character from all the strokes of the immediately preceding handwritten character string, recognize each character, and output a character string which is a recognition result.

* * * * *